Patented Feb. 26, 1929.

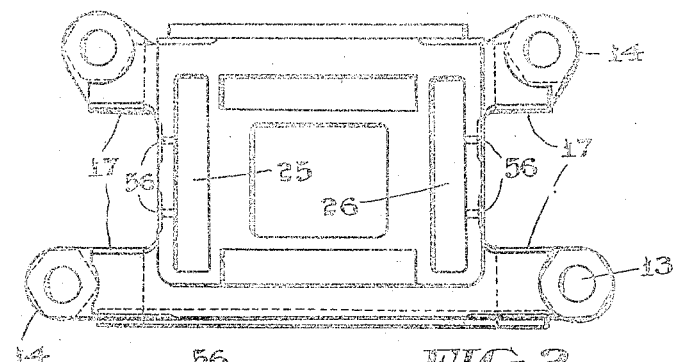
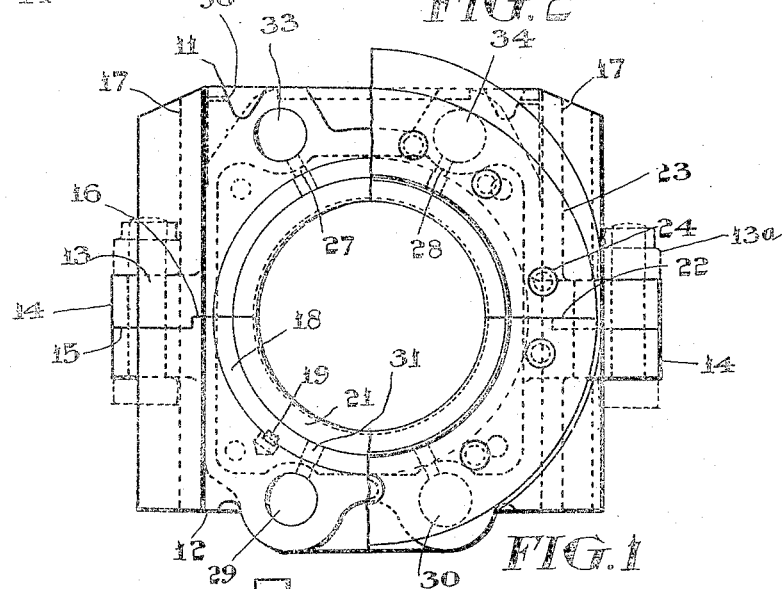
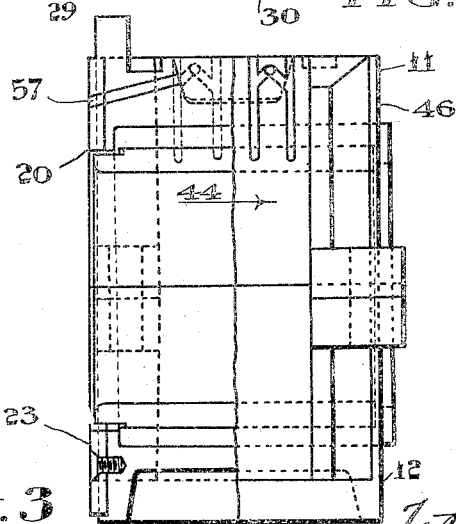

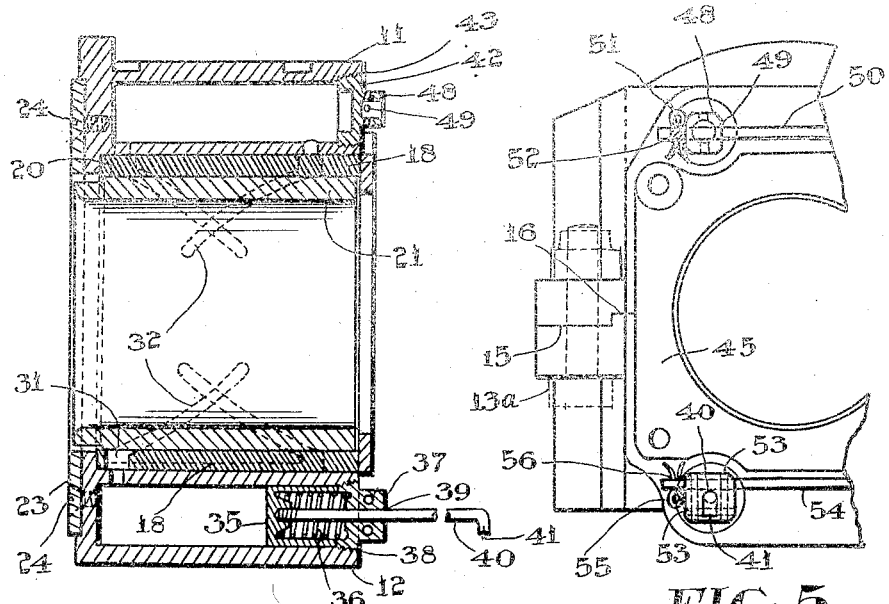
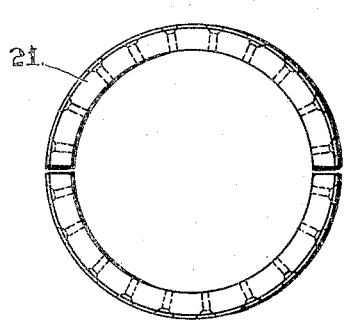
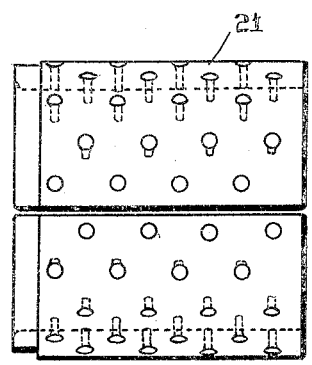

1,703,508

UNITED STATES PATENT OFFICE.

WILLIAM F. J. CASEY AND GUSTAVE CAVIN, OF KINGSTON, ONTARIO, AND CHARLES E. BROOKS, OF MONTREAL, QUEBEC, CANADA, ASSIGNORS, BY DIRECT AND MESNE ASSIGNMENTS, TO THE LOCOMOTIVE FINISHED MATERIALS COMPANY, OF ATCHISON, KANSAS.

LOCOMOTIVE-DRIVING-AXLE JOURNAL BOX.

Application filed August 28, 1926. Serial No. 132,308.

This invention relates to new and useful improvements in axle boxes for the journals of the driving axles of locomotives, and the object of the invention is to provide an axle box which will absorb the maximum thrust of the connecting rods over an area of 180° and reduce the bearing pressure per square inch of bearing surface, due to thrust, to a minimum.

Another prime object is to provide an axle box of simple construction which will allow easy access to the bearing surfaces for inspection, repairs and the like.

A further object is to provide a journal box in which the friction speed will be considerably reduced when compared with the types of boxes at present in use.

A still further object is to provide a journal box for the driving axles of locomotives in which the surface wear will be evenly distributed over a comparatively larger area than the inner diameter of the journal contacting part of the axle.

A still further object of the invention is to provide a driving axle journal box which will have means formed therein to distribute lubricant over all rotating and friction surfaces of the box.

In the invention the journal box is provided with guides and is made in sections to facilitate the assembly and inspection of the interior or bearing surfaces. Rotatably mounted within the bearing is the bushing and between said bushing and the box a liner is placed so that there are practically no parts of the bearing or box which will be subjected to wear. The lubricant is stored in a reservoir formed in the bearing and means are provided in the box, liner and bushing to distribute the lubricant to all friction surfaces. Wear plates are provided on one side of the bearing to absorb the lateral thrust exerted on the bearing by the driving wheel hubs.

In the drawings which illustrate one form of our invention—

Figure 1 is a side elevation partly in section showing our improved driving axle bearing.

Figure 2 is a plan view of the bearing shown in Figure 1.

Figure 3 is an end elevation, partly in section, of the bearing shown in Figure 1.

Figure 4 is a diagrammatic sectional end elevation of the bearing showing the forced lubrication system.

Figure 5 is a partial end elevation of the device shown in Figure 4.

Figure 6 is an end elevation of the bushing with perforations therein for distributing the lubricant.

Figure 7 is a side elevation of the bushing.

Referring more particularly to the drawings, 11 designates the top half of the journal box and 12 the bottom half united together by means of bolts, studs or the like 13$^a$, passing through the apertures 13 formed in the lugs 14, the contacting faces 15 of which are stepped as shown at 16 to prevent side movement between the parts. Between the lugs are the guides 17 which slide in the square slots cut in the engine frame in the usual manner. When the parts are bolted together they are bored to receive a liner 18 of cast iron or such like material which may be prevented from rotation by means of the key 19, part of which extends into the liner and the other part into the journal box. The liner may be driven into place from one end of the box, so that it will contact with a shoulder 20 formed in the bore of the box. A split bushing 21 is then rotatably mounted in the bore of the liner. In the drawing the liner is shown made in two sections, but this number of sections may be increased, if desired, to facilitate removal of the bushing when required. The surface of the bearing box in proximity to the driving wheel is provided with a friction ring 23 which may be attached to the box by means of the countersunk screws 24. The friction ring is made in two sections split along the line 22 so that it may be conveniently removed when the lower half of the box is removed for inspection of the rubbing surfaces. Formed in the upper half of the bearing are the two oil wells 25 and 26 and oil holes 56 and 57 are formed in these wells and communicate between the wells and the guides and also the friction or wearing ring 23, to distribute lubricant to these surfaces. Two deep recesses 29 and 30 are drilled in the lower half of the box parallel to the axis of the journal, and radiating from said recesses toward the centre of the box and passing through the liner are the oil holes 31, which communicate with grooves 32 cut in the internal face of the liner, said grooves being curved helically and adapted to cross in proximity to the centre of the bearing so that the lubricant fed from the reservoir is fed to the bushing surfaces. The bushing may be perforated as shown in Figures 6 and 7 to allow the lubricant to pass therethrough to the interior of the bushing and on to the revolving axles not shown. Two recesses 33 and 34 may also be formed in the upper half of the bearing to receive lubricant; and oil holes 27 and 28 and grooves of a similar nature to those just described with respect to the lower half, are formed to feed oil or grease to the revolving surfaces of the bearing or journal of the driving axle. The lubricant may be forced from the lower recesses 29 and 30 by any of the well known means such as is shown in Figures 4 and 5, in which pistons 35 are mounted in and adapted to contact with the walls of the recess and press against the lubricant contained therein by means of the compression springs 36 between the pistons and the caps 37 closing the ends of the recesses. These caps are provided with exterior threads 38 which engage with threads cut in the walls of the recesses. Secured to the piston and extending outwardly through apertures 39 formed in said caps are the indicating rods 40, the outer ends 41 of which are bent to form an easy means for handling or operating the lubricating pistons which are shown as only fitted in the lower recesses. The lubricant from the upper recesses may flow by gravity into the necessary parts of the journal. Threaded caps 42 engage with threaded portions 43 of the upper recesses to close the ends of same. To prevent the caps from becoming loose through vibration or the like, the top caps are provided with recessed square heads 48 and holes 49, the axes of which pass through the centre of said heads so that a locking bar 50 may pass through the holes in the two upper caps to lock them in position. To prevent longitudinal movement of the bar, cotter pins 51 are placed through apertures 52 in the bar in proximity to the adjacent surfaces of the heads of the caps. The lower caps are also provided with square recessed heads but two holes 53 are formed in each side or face of the head one above and one below the centre line of the indicating rods 40 so that a bar 54 may pass through both the lower caps and clear of the said indicating rods to lock the caps against movement. Cotter pins 55 passing through apertures 56 in the bar may be provided to lock the bars in position. To prevent movement of the bushing and the liner in the direction indicated by the arrow 44, a sectional retaining plate 45 is secured to the face 46 of the bearings, said plate being secured to the box by means of suitable screw bolts fitting into the threaded apertures 47.

In operation, this bearing is particularly designed for use on the driving axles of locomotives. The upper half of the bearing with liners and bushings is slipped into place and the lower half is then bolted thereto. Grease or oil is placed in the recesses provided for that purpose. The bearings are operating between the driving wheels and the friction rings and are so placed that they contact with the adjacent faces of said wheels and the lateral thrust of these wheels is transmitted on to these faces. The bushing is of the floating type and encircles the axle so that any pressure exerted thereon through the connecting rods is distributed evenly over one half of the bushing thereby decreasing the piston thrust bearing pressure per square inch when compared with the bearings at present in use for this purpose, none of which encircle the axles but are semi-rigid fixtures and extend for approximately half of the circumference of the axle and are positioned on the top of same. Another factor in the operating of a bushing of the floating type is that the axle rotates in the bushing and the bushing rotates in the journal box liner so that the friction speed is considerably reduced so that the bearing has a further advantage over bearings at present in use for this purpose. By decreasing the bearing pressure and also the friction speed it follows that bearings or axle boxes, designed according to the type described herein, will wear much longer and will not require inspection or repairs as often as the conventional type at present in use. The bearing is very easily dismantled for repairs as the lower half of the bearing can be removed and by jacking up the engine just enough to relieve the axle of the pressure of the weight of the engine, the sectional bushing may be withdrawn for inspection and renewed if necessary. All parts of the axle box with which rotating parts come in contact are thoroughly lubricated and the interior of the liner and the bushing are supplied with lubricant to decrease the frictional resistance between them.

Having thus described our invention, what we claim is:—

1. A journal box for the driving axles of locomotives comprising, a sectional main casing split along the centre of the casing and held together by bolts, a split bushing rotatably mounted in the casing and means to hold the bushing from movement in one direction in the casing.

2. A journal box for the driving axles of locomotives comprising a sectional main casing split along the centre line of the journal, said split casing being stepped to prevent lateral movement between the sections, bolts passing through the sections to hold them together, a split bushing rotatably mounted in the casing, means to hold the bushing from movement in one direction in the bearing and means to force lubricant to the rubbing surfaces of the bushing.

3. A journal box for the driving axles of locomotives comprising a sectional main casing split along the approximate centre line of the journal, said split being stepped to prevent lateral movement between the sections, lugs extending outwardly from the sides of the bearing, means passing through the lugs to hold the sections together, guides formed in the main casing between the lugs, a liner secured to the casing, and a split bushing rotatably mounted in the liner.

4. In a journal box for the driving axles of locomotives, a main casing split along the approximate centre line of the journal and stepped to prevent lateral movement between the parts of the casing, a split liner secured to the casing, means to bolt the sections together, guides formed in the sides of the casing, a friction washer on one end of the casing, and means to prevent movement of the bushing towards the side of the bearing remote from the friction washer.

5. In a journal box for driving axles of locomotives, a main casing split along the centre line of the journal and stepped to prevent lateral movement between the parts, means for attaching the parts together, a split circular lining secured to the casing, a split circular bushing rotatably mounted in the liner, a friction washer secured to one end of the casing, and a keeper plate secured to the other end of the casing.

6. In a journal box for locomotive driving axles, a split main casing having means to prevent movement between the sections, means securing the sections together, guides formed in the outer wall of the casing, a split friction washer secured to one end of the casing, a split circular liner secured to the casing, a split bushing rotatably mounted in the liner, a keeper plate secured to the other end of the casing, said casing having oil wells formed in the outer surfaces of the casing and ducts radiating therefrom to convey the lubricant to the guide and the friction washer, said casing also having recesses formed therein above and below the centre of the journal for a lubricant, ducts radiating from the recesses through the liner and the casing to convey lubricant to the friction surfaces of the liner and bushing, caps closing the openings of the recesses, means passing through the caps to lock them in position, and spring controlled means mounted in the lower recesses for forcing the lubricant therefrom.

7. In a car journal box, a box including two substantially half-sections provided with complemental lugs and retaining bolts passing through said lugs, and a revoluble sectionalized bearing member carried jointly by said sections.

8. In a car journal box, a box including two substantially half-sections provided with complemental lugs and retaining bolts passing through said lugs, a stationary liner carried by said box and formed in separable parts, and a revoluble sectionalized bearing member supported by said liner.

9. In a locomotive driving box, a box including two substantially half-sections provided with complemental lugs and retaining bolts passing through said lugs, a stationary liner carried by said box and formed in separable parts, said lugs forming abutments for receiving the vertical guide portions of a locomotive frame, and a revoluble sectionalized bearing member supported by said liner.

10. In a locomotive driving box, a box including two substantially half-sections provided with complemental lugs and retaining bolts passing through said lugs, and a revoluble bearing member freely revoluble with respect to the shaft supported thereby, and carried jointly by said sections.

In witness whereof, we have hereunto set our hands.

WILLIAM F. J. CASEY.
GUSTAVE CAVIN.
CHARLES E. BROOKS.